United States Patent
Miyahara et al.

(10) Patent No.: US 7,352,405 B2
(45) Date of Patent: Apr. 1, 2008

(54) OPTICAL AXIS VARYING IMAGING DEVICE

(75) Inventors: Hiroyuki Miyahara, Yokohama (JP); Fumio Nidaira, Chigasaki (JP)

(73) Assignee: Victor Company of Japan, Ltd., Yokohama (JP)

( * ) Notice: Subject to any disclaimer, the term of this patent is extended or adjusted under 35 U.S.C. 154(b) by 710 days.

(21) Appl. No.: 10/785,045

(22) Filed: Feb. 25, 2004

(65) Prior Publication Data

US 2004/0174436 A1 Sep. 9, 2004

(30) Foreign Application Priority Data

Mar. 4, 2003 (JP) .............................. 2003-056836

(51) Int. Cl.
*H04N 5/225* (2006.01)

(52) U.S. Cl. ..................... 348/374; 348/311; 348/373

(58) Field of Classification Search ............ 348/220.1, 348/311, 312, 316, 317, 267, 373, 374; 257/213
See application file for complete search history.

(56) References Cited

U.S. PATENT DOCUMENTS

| | | | |
|---|---|---|---|
| 5,206,503 A | | 4/1993 | Toops |
| 5,440,343 A | * | 8/1995 | Parulski et al. ............. 348/316 |
| 5,493,353 A | | 2/1996 | Chen |
| 6,628,751 B2 | * | 9/2003 | Eikenberg ................ 378/98.12 |
| 6,670,986 B1 | * | 12/2003 | Ben Shoshan et al. .. 348/219.1 |
| 2002/0054228 A1 | * | 5/2002 | Miyahara ..................... 348/312 |

FOREIGN PATENT DOCUMENTS

| | | |
|---|---|---|
| EP | 0669757 | 8/1995 |
| EP | 0758831 | 2/1997 |
| JP | 2002-027332 | 1/2002 |

* cited by examiner

*Primary Examiner*—David Ometz
*Assistant Examiner*—Usman Khan
(74) *Attorney, Agent, or Firm*—Louis Woo

(57) ABSTRACT

An imaging device includes a matrix array of photosensor pixels. An effective area in the array is set to a first region during a first mode of operation of the imaging device, and is set to a second region during a second mode of operation of the imaging device. The first and second regions are different in number of photosensor pixels contained therein. A holder retains the array. The holder is moved between a first position at which an optical axis related to light incident to the array coincides with a center of the first region and a second position at which the optical axis coincides with a center of the second region. The holder is fixed at the first position during the first mode of operation of the imaging device, and is fixed at the second position during the second mode of operation of the imaging device.

7 Claims, 8 Drawing Sheets

OPTICAL AXIS VARYING IMAGING DEVICE

BACKGROUND OF THE INVENTION

1. Field of the Invention

This invention relates to an imaging device suited for use in a camera capable of taking not only moving pictures but also still pictures, or taking moving pictures of different types.

2. Description of the Related Art

Some video cameras additionally have a function as an electronic still camera. Typical one of such video cameras includes a solid-state imaging element array having a matrix of 960 photosensor pixels in a horizontal direction (a row direction) and 640 photosensor pixels in a vertical direction (a column direction). Thus, the solid-state imaging element array corresponds to 640 lines. The typical video camera can selectively operate in a moving-picture taking mode or a still-picture taking mode. During the moving-picture taking mode of operation, the typical video camera generates an NTSC television signal from 525-NTSC-line signals obtained by the solid-state imaging element array for every frame. The typical video camera outputs the generated NTSC television signal. During the still-picture taking mode of operation, the typical video camera generates a still-picture signal from all-line signals (640-line signals) obtained by the solid-state imaging element array. The typical video camera outputs the generated still-picture signal. The resolution of a still picture taken by the typical video camera corresponds to about 600,000 (960 by 640) pixels.

To provide a higher picture resolution, it is known to increase the number of photosensor pixels composing a solid-state imaging element array to a range greater than 600,000. For example, a conceivable solid-state imaging element array has a matrix of 1280 photosensor pixels in a horizontal direction and 720 photosensor pixels in a vertical direction. The conceivable solid-state imaging element array corresponds to 720 lines. In the case where the 720 lines are progressively scanned for every frame with a frequency of 30 Hz, the conceivable solid-state imaging element array outputs a moving-picture signal of a 720P/30 frame system.

Generally, a solid-state imaging element array includes a CCD arrangement for transferring signal charges from photosensor pixels to an output terminal. The CCD arrangement has vertical signal-charge transfer portions (vertical CCDs) and a horizontal signal-charge transfer portion (a horizontal CCD). In the case where signal charges corresponding to 2560 (1280 multiplied by 2) pixels are transferred by a horizontal CCD for every horizontal scanning period of 63.5 µs, the horizontal transfer rate is equal to 40.31 MHz (=1280×2/63.5 µs). As the horizontal transfer rate in the horizontal CCD is increased, the rate of electric power consumed by the horizontal CCD rises and the rate of heat generated by the horizontal CCD also increases. An increase in the heat generation rate lowers the S/N ratio of a picture signal outputted from the solid-state imaging element array.

Japanese patent application publication number P2002-27332A discloses an imaging device having a solid-state imaging element array including photosensor pixels, vertical CCDs, and a horizontal CCD. Signal charges are transferred from the photosensor pixels to the horizontal CCD via the vertical CCDs before being outputted from the horizontal CCD. The imaging device in Japanese application P2002-27332A is designed to solve the above-mentioned problems, that is, an increase in the rate of electric power consumed by the horizontal CCD and a decrease in the S/N ratio of a picture signal outputted from the solid-state imaging element array. Specifically, the imaging device can selectively operate in a moving-picture taking mode or a still-picture taking mode. The solid-state imaging element array is divided into regions including regions B, D, and E. The regions B and E adjoin each other along a vertical line, and extend above the horizontal CCD. The region D is provided between the region E and the horizontal CCD. The region E is remoter from the output end of the horizontal CCD than the region B is. During the still-picture taking mode of operation, signal charges are transferred from the regions B, D, and E to the horizontal CCD. During the moving-picture taking mode of operation, signal charges are transferred from the region B to the horizontal CCD while the region D blocks the transfer of signal charges from the region E to the horizontal CCD. Thus, the number of pixels represented by signal charges transferred to the horizontal CCD during every horizontal scanning period of the moving-picture taking mode of operation can be reduced relative to that during the still-picture taking mode of operation. Accordingly, during the moving-picture taking mode of operation, the horizontal transfer rate in the horizontal CCD can be set at a relatively low value.

In the imaging device of Japanese application P2002-27332A, the region E in the solid-state imaging element array is effectively used during the still-picture taking mode of operation, and is not effectively used during the moving-picture taking mode of operation. Thus, the shape of an effective area (an actually used area) of the solid-state imaging element array and the position of the center thereof depend on whether the imaging device operates in the still-picture taking mode or the moving-picture taking mode. The imaging device includes a controller for moving the solid-state imaging element array relative to a lens to compensate for the change in the position of the center of the effective area of the solid-state imaging element array. Specifically, the controller shifts the position of the solid-state imaging element array relative to the lens depending on whether the imaging device operates in the still-picture taking mode or the moving-picture taking mode. Therefore, the position of the optical axis center of the lens relative to the solid-state imaging element array depends on whether the imaging device operates in the still-picture taking mode or the moving-picture taking mode.

SUMMARY OF THE INVENTION

It is an object of this invention to provide an imaging device which can accurately accord an optical axis center with the center of an effective area of a solid-state imaging element array.

A first aspect of this invention provides an imaging device comprising a solid-state imaging element array including a matrix of photosensor pixels; first means for setting an effective area in the solid-state imaging element array to a first region during a first mode of operation of the imaging device, and setting the effective area to a second region during a second mode of operation of the imaging device, the first and second regions being different from each other in number of photosensor pixels contained therein; a holder for retaining the solid-state imaging element array; first means for moving the holder between a first position at which an optical axis related to light incident to the solid-state imaging element array coincides with a center of the first region and a second position at which the optical axis coincides with a center of the second region; second means for fixing the holder at the first position during the first mode of operation of the imaging device, and fixing the holder at the second position during the second mode of operation of the imaging device; third means for generating a first picture signal from signal components generated in the first region of the solid-state imaging element array during the first mode of operation of the imaging device; and fourth means for generating a second picture signal from signal components generated in the second region of the solid-state imaging element array during the second mode of operation of the imaging device.

A second aspect of this invention is based on the first aspect thereof, an provides an imaging device wherein the matrix in the solid-state imaging element array has a first predetermined number "a" of photosensor pixels in a horizontal direction and a second predetermined number "b" of photosensor pixels in a vertical direction, the first region has the first predetermined number "a" of photosensor pixels in the horizontal direction and the second predetermined number "b" of photosensor pixels in the vertical direction, and the second region has a third predetermined number "c" of photosensor pixels in the horizontal direction and the second predetermined number "b" of photosensor pixels in the vertical direction, the third predetermined number "c" is smaller than the first predetermined number "a".

A third aspect of this invention is based on the first aspect thereof, and provides an imaging device wherein the first means comprises a guide bar, means for slidably supporting the holder on the guide bar, a movable lever, and means for moving the holder along the guide bar in accordance with movement of the lever.

A fourth aspect of this invention provides an imaging device comprising a solid-state imaging element array including a matrix of photosensor pixels; first means for setting an effective area in the solid-state imaging element array to a first region during a first mode of operation of the imaging device, and setting the effective area to a second region during a second mode of operation of the imaging device, the first and second regions being different from each other in number of photosensor pixels contained therein; an optical system extending in front of the solid-state imaging element array; second means included in the optical system for moving an optical axis of the optical system relative to the solid-state imaging element array; third means for controlling the second means to set the optical axis coincident with a center of the first region during the first mode of operation of the imaging device, and to set the optical axis coincident with a center of the second region during the second mode of operation of the imaging device; fourth means for generating a first picture signal from signal components generated in the first region of the solid-state imaging element array during the first mode of operation of the imaging device; and fifth means for generating a second picture signal from signal components generated in the second region of the solid-state imaging element array during the second mode of operation of the imaging device.

A fifth aspect of this invention is based on the fourth aspect thereof, and provides an imaging device wherein the matrix in the solid-state imaging element array has a first predetermined number "a" of photosensor pixels in a horizontal direction and a second predetermined number "b" of photosensor pixels in a vertical direction, the first region has the first predetermined number "a" of photosensor pixels in the horizontal direction and the second predetermined number "b" of photosensor pixels in the vertical direction, and the second region has a third predetermined number "c" of photosensor pixels in the horizontal direction and the second predetermined number "b" of photosensor pixels in the vertical direction, the third predetermined number "c" is smaller than the first predetermined number "a".

DETAILED DESCRIPTION OF THE INVENTION

First Embodiment

Figure 1:
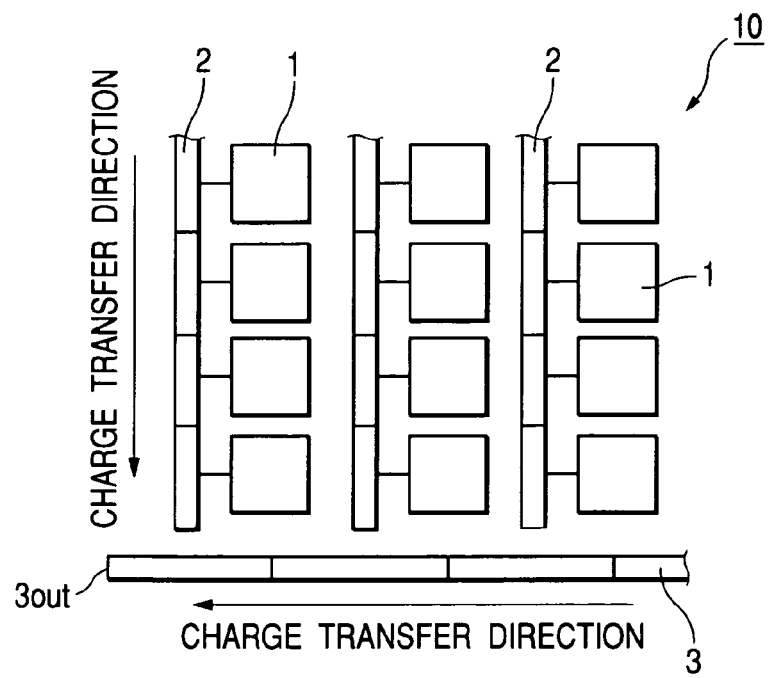
FIG. 1 is a diagram of a portion of a solid-state imaging element array in an imaging device according to a first embodiment of this invention.

With reference to FIG. 1, photoelectric conversion elements (photosensor pixels or photodetector pixels) 1 are arranged in a matrix 10 referred to as a solid-state imaging element array 10. The solid-state imaging element array 10 has columns and rows of photo conversion elements 1. The columns of the photoelectric conversion elements 1 are located near and connected with vertical charge-transfer CCDs 2, respectively. The vertical charge-transfer CCDs 2 are referred to as the vertical CCDs 2. In every set of a photoelectric-conversion-element column and a vertical CCD 2, the photoelectric conversion elements 1 are connected with successive segments (stages) of the vertical CCD 2 respectively. The lower ends of the vertical CCDs 2 are connected with successive segments (stages) of a horizontal charge-transfer CCD 3 respectively. The horizontal charge-transfer CCD 3 is referred to as the horizontal CCD 3.

Each of the photoelectric conversion elements 1 generates signal charges in response to a portion of incoming light which is applied thereto. Generated signal charges are moved from the photoelectric conversion elements 1 to the related segments of the vertical CCDs 2 before being vertically transferred by the vertical CCDs 2 to the horizontal CCD 3. The signal charges are horizontally transferred by the horizontal CCD 3 before being moved from an output end 3out of the horizontal CCD 3 to a next stage or an external section as portions of a picture signal. The output end 3out of the horizontal CCD 3 forms an output terminal of the solid-state imaging element array 10.

Preferably, the solid-state imaging element array 10 is subjected to progressive scan so that a picture signal corresponding to one frame can be outputted from the array 10 during every field period of a television signal.

Figure 2:
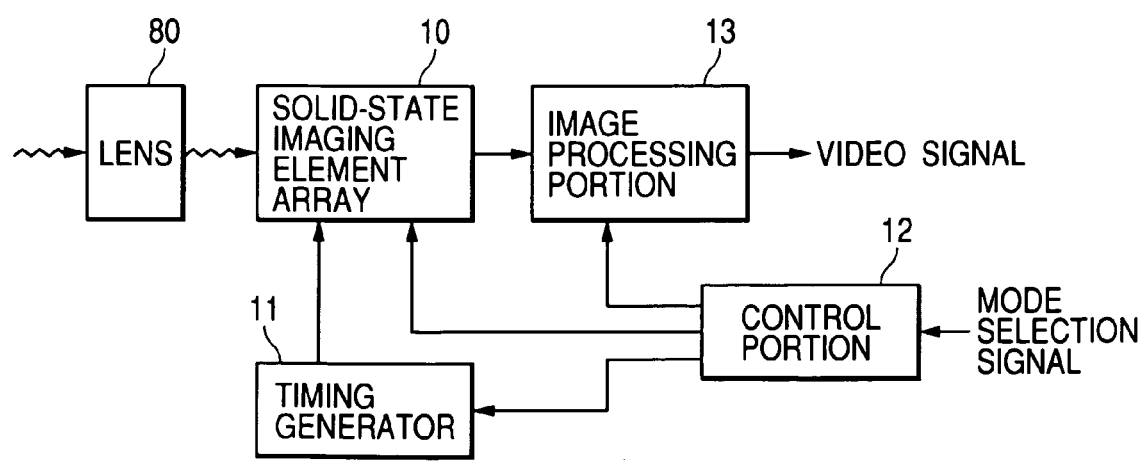
FIG. 2 is a block diagram of the imaging device in the first embodiment of this invention.

With reference to FIG. 2, an imaging device in a first embodiment of this invention includes the solid-state imaging element array 10, a timing generator 11, a control portion 12, and an image processing portion 13. The timing generator 11 produces timing signals in response to a control signal fed from the control portion 12. The timing generator 11 outputs the produced timing signals to the solid-state imaging element array 10. The timing signals include drive signals and clock signals for the vertical CCDs 2 and the horizontal CCD 3. The imaging device operates in one selected from various modes including a first moving-picture taking mode, a second moving-picture taking mode, and a still-picture taking mode. The operation mode of the imaging device can be changed in response to a mode selection signal generated by a user interface or an input unit which can be actuated by a user. Generally, the mode selection signal indicates a desired or designated mode of operation of the imaging device. The control portion 12 receives the mode selection signal. The control portion 12 controls the solid-state imaging element array 10, the timing generator 11, and the image processing portion 13 in response to the mode selection signal so that the imaging device will operate in the mode accorded with the mode selection signal. The solid-state imaging element array 10 generates a picture signal while being driven by the timing signals from the timing generator 11 and being controlled by the control portion 12. The generated picture signal is transmitted from the solid-state imaging element array 10 to the image processing portion 13 via the output end 3out of the horizontal CCD 3, that is, the output terminal of the solid-state imaging element array 10. The image processing portion 13 processes the picture signal into a video signal (or a second picture signal) while being controlled by the control portion 12. The image processing portion 13 outputs the video signal as an output signal of the imaging device. The video signal is of one selected from various formats including the NTSC format, the HD television format (the high-definition television format), and the still-picture format.

The control portion 12 includes, for example, a microcomputer or a similar device having a combination of an input/output section, a processing section, a ROM, and a RAM. In this case, the control portion 12 operates in accordance with a computer program stored in the ROM. The computer program is designed so that the control portion 12 will implement operation steps assigned thereto and mentioned later.

Figure 3:
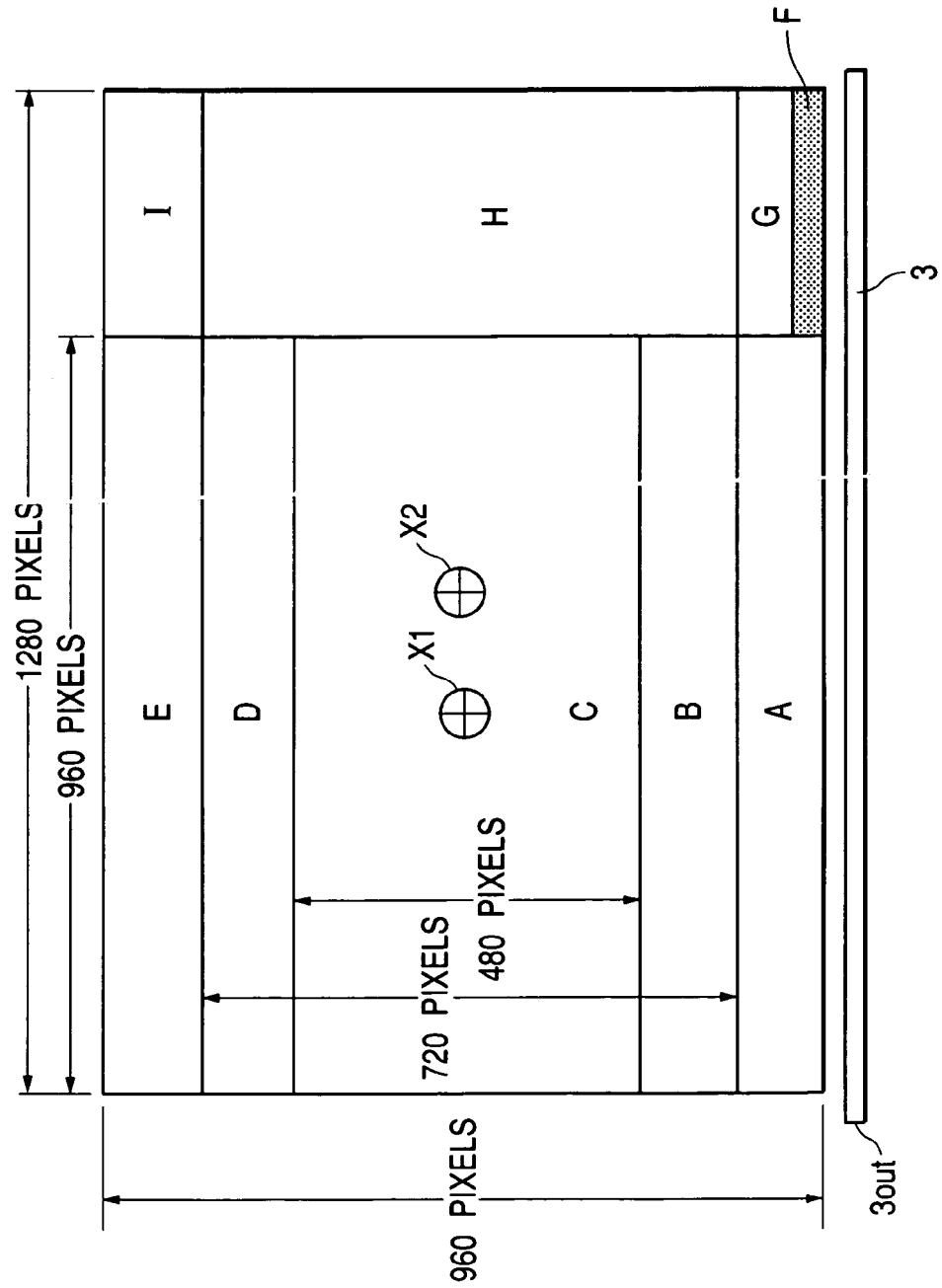
FIG. 3 is a diagram of the solid-state imaging element array in the first embodiment of this invention.

As shown in FIG. 3, the solid-state imaging element array 10 is of a matrix structure having 1280 photosensor pixels (photoelectric conversion elements) in a horizontal direction and 960 photosensor pixels (photoelectric conversion elements) in a vertical direction. The horizontal direction and the vertical direction correspond to the row direction and the column direction with respect to the matrix, respectively. The photosensitive area of the solid-state imaging element array 10 is divided into rectangular regions "A", "B", "C", "D", "E", "F", "G", "H", and "I" having horizontal and vertical sides extending along the horizontal and vertical directions. The regions "A", "B", "C", "D", and "E" are successively arranged in that order and align with each other as viewed in the upward vertical direction. The region "A" adjoins the horizontal CCD 3. The regions "F", "G", "H", and "I" are successively arranged in that order and align with each other as viewed in the upward vertical direction. The region "F" adjoins the horizontal CCD 3. The group of the regions "A", "B", "C", "D", and "E" and the group of the regions "F", "G", "H", and "I" are juxtaposed or arranged on a side-by-side basis in the horizontal direction. The region "H" horizontally aligns with the set of the regions "B", "C", and "D". The group of the regions "F", "G", "H", and "I" is remoter from the output end 3out of the horizontal CCD 3 than the group of the regions "A", "B", "C", "D", and "E" is.

The region "C" has 960 photosensor pixels 1 in the horizontal direction and 480 photosensor pixels 1 in the vertical direction. The set of the regions "B", "C", and "D" has 960 photosensor pixels 1 in the horizontal direction and 720 photosensor pixels in the vertical direction. The group of the regions "A", "B", "C", "D", and "E" has 960 photosensor pixels 1 in the horizontal direction and 960 photosensor pixels 1 in the vertical direction. The region "H" has 320 photosensor pixels 1 in the horizontal direction and 720 photosensor pixels 1 in the vertical direction. The group of the regions "F", "G", "H", and "I" has 320 photosensor pixels 1 in the horizontal direction and 960 photosensor pixels in the vertical direction.

During the first moving-picture taking mode of operation, the video signal generated by and outputted from the imaging device is of the NTSC format. During the second moving-picture taking mode of operation, the video signal generated by and outputted from the imaging device is of the HD television format. During the still-picture taking mode of operation, the video signal generated by and outputted from the imaging device is of the still-picture format.

During the first moving-picture taking mode of operation, signal charges generated in the region "C" are used to generate an NTSC television signal. Signal charges generated in the regions "A", "B", and "D"-"I" are excluded from the generation of the NTSC television signal. In more detail, during the first moving-picture taking mode of operation, signal charges generated in the regions "A", "B", "D", and "E" are excluded from the generation of the NTSC television signal, and the region "F" is controlled to block the transfer of signal charges from the regions "G", "H", and "I" to the horizontal CCD 3. Thus, the transfer of signal charges to a deep end portion of the horizontal CCD 3 which is remote from the output end 3out is blocked. During the second moving-picture taking mode of operation, the region "F" is controlled to allow the transfer of signal charges so that signal charges generated in the regions "B", "C", "D", and "H" are used to generate an HD television signal. Signal charges generated in the regions "A", "E", "F", "G", and "I" are excluded from the generation of the HD television signal. During the still-picture taking mode of operation, signal charges generated in all the regions "A"-"I" are used to generate a still-picture signal. In this way, an effective area (an actually used area) in the solid-state imaging element array 10 depends on the mode of operation of the imaging device.

The imaging device includes an optical system located in front of the solid-state imaging element array 10. Incoming light is incident to the solid-state imaging element array 10 through the optical system. The optical system has a lens 80 extending in front of the solid-state imaging element array 10. As will be mentioned later, the optical axis center of the optical system or the lens 80 is shifted relative to the solid-state imaging element array 10 depending on the mode of operation of the imaging device. During the first moving-picture taking mode of operation, the optical axis center of the lens 80 (the optical system) is located at a position X1 coincident with the center of the region "C". During the second moving-picture taking mode of operation or the still-picture taking mode of operation, the optical axis center of the lens 80 is located at a position X2 coincident with the center of the set of the regions "B", "C", "D", and "H" or the center of the solid-state imaging element array 10 (the center of the set of all the regions "A"-"I". The positions X1 and X2 are spaced horizontally.

The imaging device includes an actuator for moving the solid-state imaging element array 10 relative to the lens 80 in the horizontal direction. The control portion 12 drives and controls the actuator to change the optical axis center of the lens 80 between the positions X1 and X2 in response to the mode selection signal.

The actuator may be replaced by a manually-operated mechanism for moving the solid-state imaging element array 10 relative to the lens 80 in the horizontal direction. In this case, the manually-operated mechanism is actuated by a user to change the optical axis center of the lens 80 between the positions X1 and X2 in accordance with the mode of operation of the imaging device.

The imaging device operates as follows. During the first moving-picture taking mode of operation, the control portion 12 controls the timing generator 11 to generate drive pulse signals. The timing generator 11 outputs the generated drive pulse signals to the solid-state imaging element array 10. The drive pulse signals include a drive pulse signal for reading out signal charges from the photoelectric conversion elements 1 (a readout pulse signal), a drive pulse signal for the vertical CCDs 2, and a drive pulse signal for the horizontal CCD 3. The control portion 12 controls the actuator to locate the optical axis center of the lens 80 at the position X1 (see FIG. 3). In addition, the control portion 12 controls the solid-state imaging element array 10 so that the region "F" will block the transfer of signal charges along the related vertical CCDs 2. For example, there is a switch for selectively allowing and inhibiting the application of the drive pulse signal to the stages of the vertical CCDs 2 in the region "F". In this case, the control portion 12 controls the switch to inhibit the application of the drive pulse signal to the stages of the vertical CCDs 2 in the region "F", thereby blocking the transfer of the signal charges along the vertical CCDs 2 in the region "F".

During the first moving-picture taking mode of operation, when the timing generator 11 applies a pulse of the readout pulse signal to the solid-state imaging element array 10, signal charges are transferred from the photoelectric conversion elements 1 to the nearby vertical CCDs 2. Then, the signal charges are shifted toward the horizontal CCD 3 along the vertical CCDs 2 at a timing given by every pulse of the drive pulse signal for the vertical CCDs 2. Until all the signal charges generated in the regions "A" and "B" reach the horizontal CCD 3, the timing generator 11 is controlled by the control portion 12 to hold the drive pulse signal for the vertical CCDs 2 at a predetermined very high frequency. Thus, the signal charges are transferred by the vertical CCDs 2 at a very high rate. The above-indicated frequency setting of the drive pulse signal for the vertical CCDs 2 is based on the fact that the signal charges generated in the regions "A" and "B" are not used to generate an NTSC television signal. The timing generator 11 is controlled by the control portion 12 to hold the drive pulse signal for the horizontal CCD 3 at a predetermined frequency chosen so that signal charges corresponding to 1920 pixels can be transferred by the horizontal CCD 3 for every horizontal scanning period of the NTSC television signal.

During the first moving-picture taking mode of operation, immediately before the signal charges generated in the lower edge of the region "C" reach the horizontal CCD 3, the timing generator 11 is controlled by the control portion 12 to change the frequency of the drive pulse signal for the vertical CCDs 2 to a predetermined intermediate value at which signal charges are shifted by one stage toward the horizontal CCD 3 for every half of the horizontal scanning period of the NTSC television signal. Thus, signal charges are shifted by two stages for every horizontal scanning period. As a result, all the signal charges generated in the region "C" are transferred to the horizontal CCD 3 for 240 horizontal scanning periods (480 lines divided by 2). While the signal charges generated in the region "C" are being transferred to the horizontal CCD 3, signal charges corresponding to 1920 pixels are transferred by the horizontal CCD 3 for every horizontal scanning period. Thus, the solid-state imaging element array 10 outputs a portion of a picture signal which represents 1920 pixels for every horizontal scanning period. When the transfer of all the signal charges generated in the region "C" to the horizontal CCD 3 is completed, the timing generator 11 is controlled by the control portion 12 to set the drive pulse signal for the vertical CCDs 2 at the predetermined very high frequency again. Then, the drive pulse signal for the vertical CCDs 2 is held at the predetermined very high frequency so that all the signal charges generated in the regions "D" and "E" are transferred to the horizontal CCD 3 at the very high rate. On the other hand, the transfer of all the signal charges generated in the regions "G", "H", and "I" toward the horizontal CCD 3 are blocked by the region "F". Therefore, all the signal charges generated in the regions "G", "H", and "I" are prevented from reaching the horizontal CCD 3.

Figure 4:
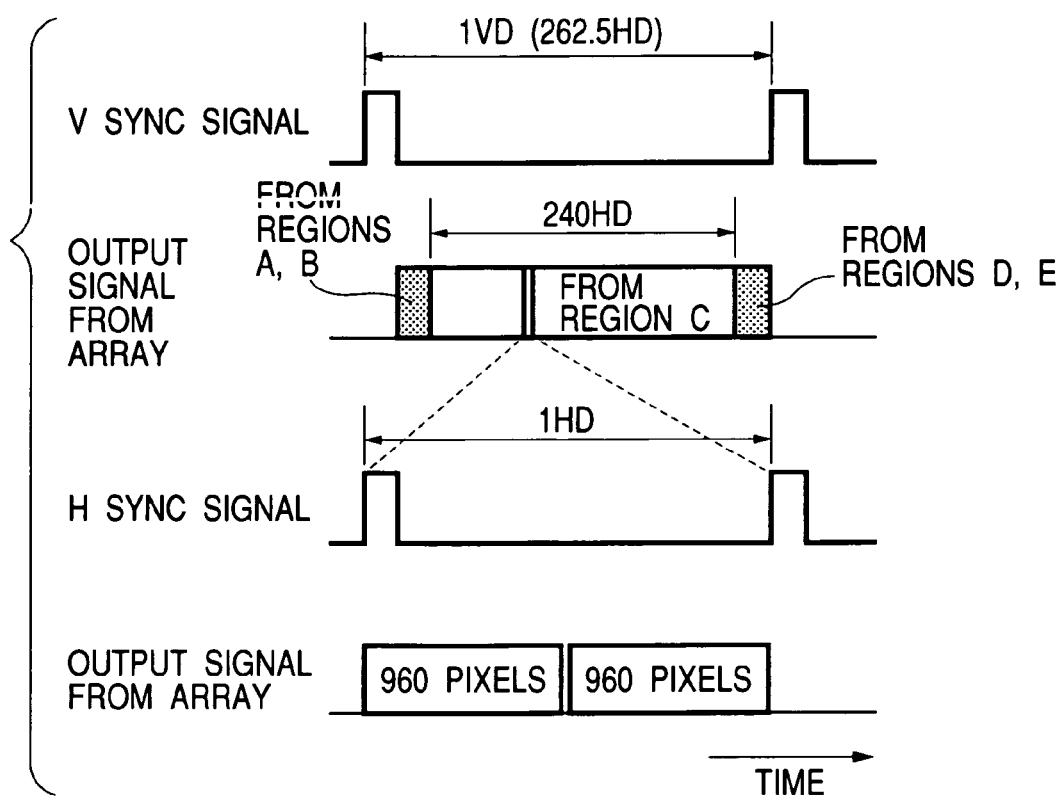
FIG. 4 is a time-domain diagram of a vertical sync signal, a horizontal sync signal, and an output signal from the solid-state imaging element array which occurs during a first moving-picture taking mode of operation of the imaging device in FIG. 2.

As shown in FIG. 4, a vertical sync signal in an NTSC television signal has a train of pulses spaced at regular intervals equal to a vertical scanning period or a 1-field period 1VD. One field period 1VD is composed of 262.5 horizontal scanning periods (262.5HD). A horizontal sync signal in the NTSC television signal has a train of pulses spaced at regular intervals equal to a horizontal scanning period 1HD.

In the case where the imaging device operates in the first moving-picture taking mode, during a former portion of every field period 1VD, the drive pulse signal for the vertical CCDs 2 is held at the predetermined very high frequency so that signal charges generated in the regions "A" and "B" are transferred to the horizontal CCD 3 at the very high rate. Thus, during the former portion of every field period 1VD, a picture signal outputted from the solid-state imaging element array 10 originates from the signal charges generated in the regions "A" and "B". Similarly, during an end portion of every field period 1VD, the drive pulse signal for the vertical CCDs 2 is held at the predetermined very high frequency so that signal charges generated in the regions "D" and "E" are transferred to the horizontal CCD 3 at the very high rate. Thus, during the end portion of every field period 1VD, the picture signal outputted from the solid-state imaging element array 10 originates from the signal charges generated in the regions "D" and "E". On the other hand, during an intermediate portion of every field period 1VD which corresponds to 240 times one horizontal scanning period 1HD (that is, 240HD), the frequency of the drive pulse signal for the vertical CCDs 2 is kept at the predetermined intermediate value at which signal charges generated in the region "C" are shifted by two stages toward the horizontal CCD 3 for every horizontal scanning period 1HD. Thus, during the intermediate portion (the 240HD portion) of every field period 1VD, signal charges generated in the region "C" which correspond to 480 stages are transferred to the horizontal CCD 3. During the intermediate portion of every field period 1VD, the horizontal CCD 3 outputs signal charges corresponding to 480 lines each composed of 960 pixels. The outputted signal charges are those generated in the region "C". Therefore, during the intermediate portion of every field period 1VD, the picture signal outputted from the solid-state imaging element array 10 originates from the signal charges generated in the region "C". As shown in FIG. 4, for every horizontal scanning period 1HD, the horizontal CCD 3 outputs signal charges corresponding to 2 lines each composed of 960 pixels.

During the first moving-picture taking mode of operation, the image processing portion 13 receives the picture signal from the solid-state imaging element array 10. In response to a control signal fed from the control portion 12, the image processing portion 13 generates an NTSC television signal from only portions of the picture signal which reflect the signal charges generated in the region "C". The image processing portion 13 excludes, from the generation of the NTSC television signal, portions of the picture signal which reflect the signal charges generated in the regions "A", "B", "D", and "E". The image processing portion 13 outputs the NTSC television signal.

As previously mentioned, during the first moving-picture taking mode of operation, the signal charges generated in the regions "F", "G", "H", and "I" are inhibited from reaching the horizontal CCD 3 while the signal charges generated in the regions "A", "B", "C", "D", and "E" are transferred to the horizontal CCD 3. Thus, only signal charges originating from those generated in the regions "A", "B", "C", "D", and "E" are transferred by the horizontal CCD 3. Therefore, the frequency of the drive pulse signal for the horizontal CCD 3 can be the same as that of a drive pulse signal for vertical CCDs in a solid-state imaging element array having 960 photosensor pixels along a horizontal direction. In the case where one horizontal scanning period 1HD is equal to 63.5 µs, the horizontal transfer rate related to the horizontal CCD 3 is equal to 30.24 MHz (=960×2/63.5 µs). The horizontal transfer rate is equivalent to the frequency of the drive pulse signal for the horizontal CCD 3. When the transfer of an OB (optical black level: dark current correction) signal is considered, a preferable horizontal transfer rate related to the horizontal CCD 3 is slightly higher than 30.24 MHz.

The picture signal generated during the first moving-picture taking mode of operation can be outputted as a television signal of a 480P system designed so that 480 effective scanning lines are progressively scanned at a frame frequency of 60 Hz or a television signal of a 480I system designed so that 480 effective scanning lines are interlacedly scanned at a field frequency of 60 Hz.

An anti-shake process can be implemented by use of the solid-state imaging element array 10 during the first moving-picture taking mode of operation. Specifically, the direction and amount of a shake of the solid-state imaging element array 10 are detected, and information representative thereof is generated in a known way. The shake direction and amount information is fed to the control portion 12. The timing generator 11 is controlled by the control portion 12 in response to the shake direction and amount information so that the timing given by the drive pulse signal for the vertical CCDs 2 will depend on the shake direction and amount information. Thereby, the region "C" is virtually moved in the vertical direction to compensate for the shake.

An arrangement of photoelectric conversion elements may be added to the left edge of the solid-state imaging element array 10 in FIG. 3. In this case, a horizontal anti-shake process can be implemented by use of the solid-state imaging element array 10 during the first moving-picture taking mode of operation.

The region "C" may be at a place slightly shifted rightward from that in FIG. 3. Also in this case, a horizontal anti-shake process can be implemented by use of the solid-state imaging element array 10 during the first moving-picture taking mode of operation.

The second moving-picture taking mode of operation will be described below in more detail. During the second moving-picture taking mode of operation, the control portion 12 controls the timing generator 11 to generate drive pulse signals. The timing generator 11 outputs the generated drive pulse signals to the solid-state imaging element array 10. The drive pulse signals include a drive pulse signal for reading out signal charges from the photoelectric conversion elements 1 (a readout pulse signal), a drive pulse signal for the vertical CCDs 2, and a drive pulse signal for the horizontal CCD 3. The control portion 12 controls the actuator to locate the optical axis center of the lens 80 at the position X2 (see FIG. 3). In addition, the control portion 12 controls the solid-state imaging element array 10 so that the region "F" will allow the transfer of signal charges along the related vertical CCDs 2 and operate as normal one.

During the second moving-picture taking mode of operation, when the timing generator 11 applies a pulse of the readout pulse signal to the solid-state imaging element array 10, signal charges are transferred from the photoelectric conversion elements 1 to the nearby vertical CCDs 2. Then, the signal charges are shifted toward the horizontal CCD 3 along the vertical CCDs 2 at a timing given by every pulse of the drive pulse signal for the vertical CCDs 2. Until all the signal charges generated in the regions "A", "F", and "G" reach the horizontal CCD 3, the timing generator 11 is controlled by the control portion 12 to hold the drive pulse signal for the vertical CCDs 2 at the predetermined very high frequency. Thus, the signal charges are transferred by the vertical CCDs 2 at the very high rate. The above-indicated frequency setting of the drive pulse signal for the vertical CCDs 2 is based on the fact that the signal charges generated in the regions "A", "F", and "G" are not used to generate an HD television signal. The timing generator 11 is controlled by the control portion 12 to hold the drive pulse signal for the horizontal CCD 3 at the predetermined frequency chosen so that signal charges corresponding to 1920 pixels can be transferred by the horizontal CCD 3 for every horizontal scanning period 1HD (defined in the NTSC system). Thus, signal charges corresponding to 3840 pixels, that is, signal charges corresponding to 3 lines each composed of 1280 pixels, are transferred by the horizontal CCD 3 for every 2 horizontal scanning periods 2HD. The frequency of the drive pulse signal for the horizontal CCD 3 is the same as that during the first moving-picture taking mode of operation. This design can simplify the structure of the image processing portion 13.

During the second moving-picture taking mode of operation, immediately before the signal charges generated in the lower edges of the regions "B" and "H" reach the horizontal CCD 3, the timing generator 11 is controlled by the control portion 12 to change the frequency of the drive pulse signal for the vertical CCDs 2 to a predetermined intermediate value at which signal charges are shifted by three stages toward the horizontal CCD 3 for every 2 horizontal scanning periods 2HD (defined in the NTSC system). As a result, all the signal charges generated in the regions "B", "C", "D", and "H" and corresponding to 720 lines (720 stages) are transferred to the horizontal CCD 3 for 480 horizontal scanning periods 480HD. While the signal charges generated in the regions "B", "C", "D", and "H" are being transferred to the horizontal CCD 3, signal charges corresponding to 3840 pixels (3 lines each composed of 1280 pixels) are transferred by the horizontal CCD 3 for every 2 horizontal scanning periods 2HD. Thus, the solid-state imaging element array 10 outputs a portion of a picture signal which represents 3840 pixels (3 lines) for every 2 horizontal scanning periods 2HD. When the transfer of all the signal charges generated in the regions "B", "C", "D", and "H" to the horizontal CCD 3 is completed, the timing generator 11 is controlled by the control portion 12 to set the drive pulse signal for the vertical CCDs 2 at the predetermined very high frequency again. Then, the drive pulse signal for the vertical CCDs 2 is held at the predetermined very high frequency so that all the signal charges generated in the regions "E" and "I" are transferred to the horizontal CCD 3 at the very high rate.

Figure 5:
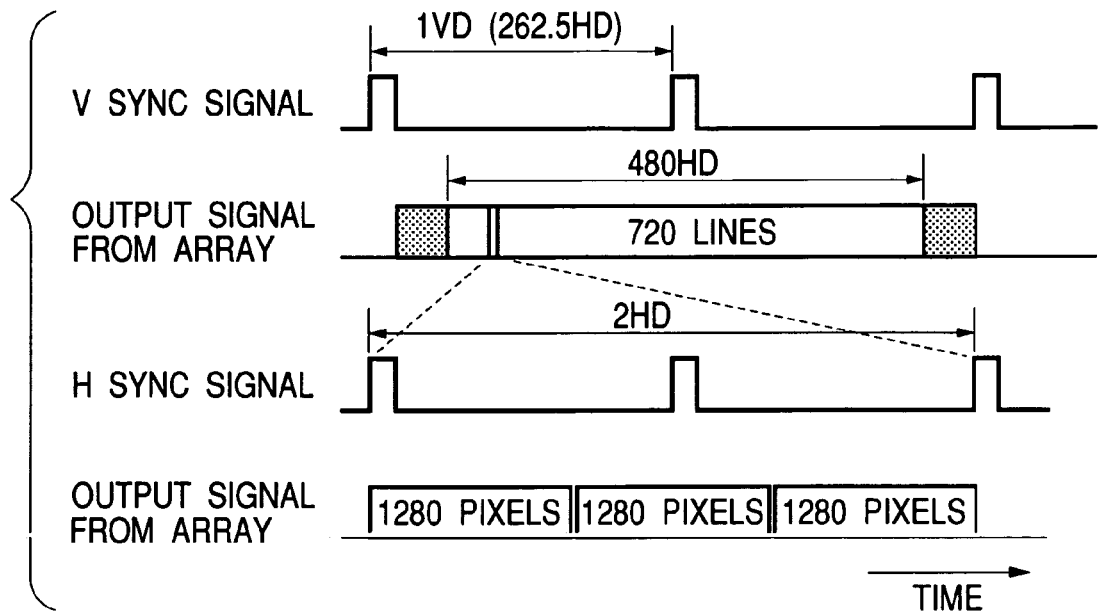
FIG. 5 is a time-domain diagram of a vertical sync signal, a horizontal sync signal, and an output signal from the solid-state imaging element array which occurs during a second moving-picture taking mode of operation of the imaging device in FIG. 2.

With reference to FIG. 5, in the case where the imaging device operates in the second moving-picture taking mode, during 480 horizontal scanning periods 480HD in every 2 vertical scanning periods 2VD (defined in the NTSC system), the horizontal CCD 3 outputs signal charges corresponding to 720 lines each composed of 1280 pixels. The outputted signal charges are those generated in the regions "B", "C", "D", and "H". Therefore, the picture signal outputted from the solid-state imaging element array 10 has portions originating from the signal charges generated in the regions "B", "C", "D", and "H". As shown in FIG. 5, for every 2 horizontal scanning periods 2HD, the horizontal CCD 3 outputs signal charges corresponding to 3 lines each composed of 1280 pixels.

During the second moving-picture taking mode of operation, the image processing portion 13 receives the picture signal from the solid-state imaging element array 10. In response to a control signal fed from the control portion 12, the image processing portion 13 generates an HD television signal from only portions of the picture signal which reflect the signal charges generated in the regions "B", "C", "D", and "H". Preferably, the image processing portion 13 excludes, from the generation of the HD television signal, portions of the picture signal which reflect the signal charges generated in the regions "A", "E", "F", "G", and "I". The image processing portion 13 outputs the HD television signal. The number of pixels composing a frame represented by the HD television signal is equal to twice that of pixels composing a frame represented by the NTSC television signal generated during the first moving-picture taking mode of operation. The per-second frame number of the HD television signal is equal to a half of that of the NTSC television signal generated during the first moving-picture taking mode of operation. Preferably, the frequency of the drive pulse signal for the horizontal CCD 3 is equal to 30.24 MHz or higher during the second moving-picture taking mode of operation.

The picture signal outputted from the solid-state imaging element array 10 may be subjected to a vertical anti-shake process using a memory. In this case, every set of 2 neighboring vertical scanning periods 2VD is divided into a former portion, an intermediate portion, and an end portion. During the former portion, signal charges generated in the regions "A", "F", and "G" are outputted from the solid-state imaging element array 10 as a portion of a picture signal. The intermediate portion is assigned to the transfer of signal charges generated in the regions "B", "C", "D", and "H" to generate a corresponding portion of the picture signal. For every 2 horizontal scanning periods 2HD in the intermediate portion, signal charges are shifted by 3 stages toward the horizontal CCD 3. During the end portion, signal charges generated in the regions "E" and "I" are outputted from the solid-state imaging element array 10 as a portion of the picture signal.

The still-picture taking mode of operation will be described below in more detail. During the still-picture taking mode of operation, the control portion 12 controls the timing generator 11 to generate drive pulse signals. The timing generator 11 outputs the generated drive pulse signals to the solid-state imaging element array 10. The drive pulse signals include a drive pulse signal for reading out signal charges from the photoelectric conversion elements 1 (a readout pulse signal), a drive pulse signal for the vertical CCDs 2, and a drive pulse signal for the horizontal CCD 3. The control portion 12 controls the actuator to locate the optical axis center of the lens 80 at the position X2 (see FIG. 3). In addition, the control portion 12 controls the solid-state imaging element array 10 so that the region "F" will allow the transfer of signal charges along the related vertical CCDs 2 and operate as normal one.

During the still-picture taking mode of operation, the timing generator 11 applies only one pulse of the readout pulse signal to the solid-state imaging element array 10. Upon the application of the pulse of the readout pulse signal to the solid-state imaging element array 10, signal charges are transferred from the photoelectric conversion elements 1 to the nearby vertical CCDs 2. Then, the signal charges are shifted toward the horizontal CCD 3 along the vertical CCDs 2 at a timing given by every pulse of the drive pulse signal for the vertical CCDs 2. During the still-picture taking mode of operation, the timing generator 11 is controlled by the control portion 12 to hold the drive pulse signal for the vertical CCDs 2 at the predetermined intermediate frequency at which signal charges are shifted by three stages toward the horizontal CCD 3 for every 2 horizontal scanning periods 2HD (defined in the NTSC system). As a result, all the signal charges generated in all the regions "A"-"I" and corresponding to 960 lines (960 stages) are transferred to the horizontal CCD 3 for 640 horizontal scanning periods 640HD.

During the still-picture taking mode of operation, the timing generator 11 is controlled by the control portion 12 to hold the drive pulse signal for the horizontal CCD 3 at the predetermined frequency chosen so that signal charges corresponding to 1920 pixels can be transferred by the horizontal CCD 3 for every horizontal scanning period 1HD (defined in the NTSC system). Thus, signal charges corresponding to 3840 pixels, that is, signal charges corresponding to 3 lines each composed of 1280 pixels, are transferred by the horizontal CCD 3 for every 2 horizontal scanning periods 2HD. The frequency of the drive pulse signal for the horizontal CCD 3 is the same as that during the first or second moving-picture taking mode of operation. This design can simplify the structure of the image processing portion 13.

Figure 6:
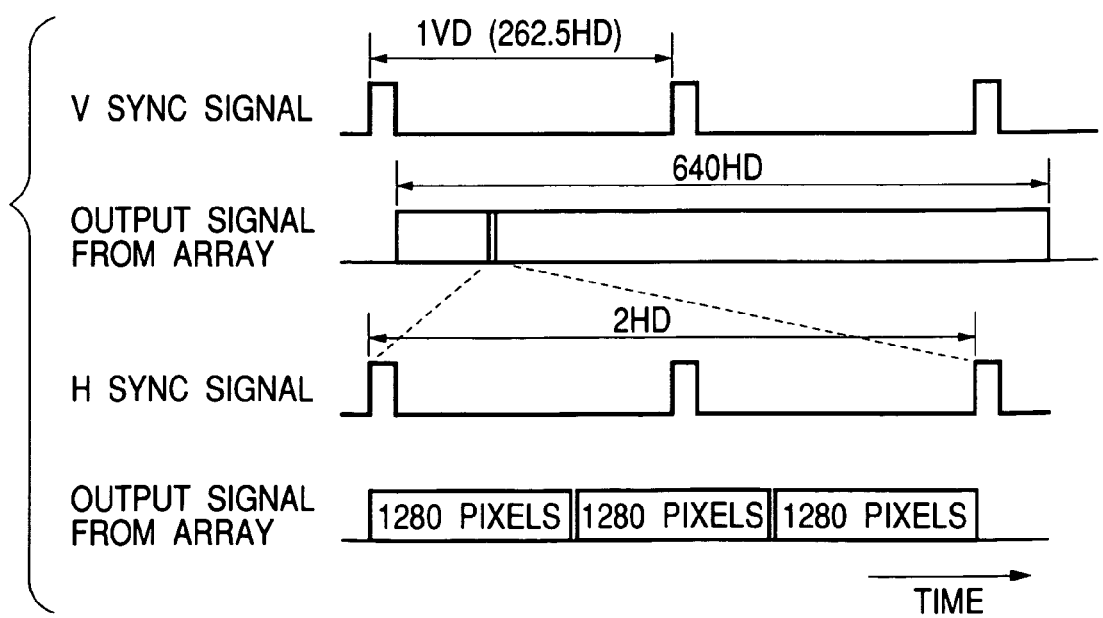
FIG. 6 is a time-domain diagram of a vertical sync signal, a horizontal sync signal, and an output signal from the solid-state imaging element array which occurs during a still-picture taking mode of operation of the imaging device in FIG. 2.

With reference to FIG. 6, in the case where the imaging device operates in the still-picture taking mode, during 640 horizontal scanning periods 640HD in longer than every 2 vertical scanning periods 2VD (defined in the NTSC system), the horizontal CCD 3 outputs signal charges corresponding to 960 lines each composed of 1280 pixels. The outputted signal charges are those generated in all the regions "A"-"I". Therefore, the picture signal outputted from the solid-state imaging element array 10 represents a 1-frame still picture composed of 1280 pixels in the horizontal direction and 960 pixels in the vertical direction which originate from the signal charges generated in all the regions "A"-"I". As shown in FIG. 6, for every 2 horizontal scanning periods 2HD, the horizontal CCD 3 outputs signal charges corresponding to 3 lines each composed of 1280 pixels.

During the still-picture taking mode of operation, the image proccesing portion 13 receives the picture signal from the solid-state imaging element array 10. In response to a control signal fed from the control portion 12, the image processing portion 13 converts the received picture signal into a second picture signal (a video signal) of a prescribed format which represents the still picture of 1280 by 960 pixels. The image processing portion 13 outputs the second picture signal.

Figure 7:
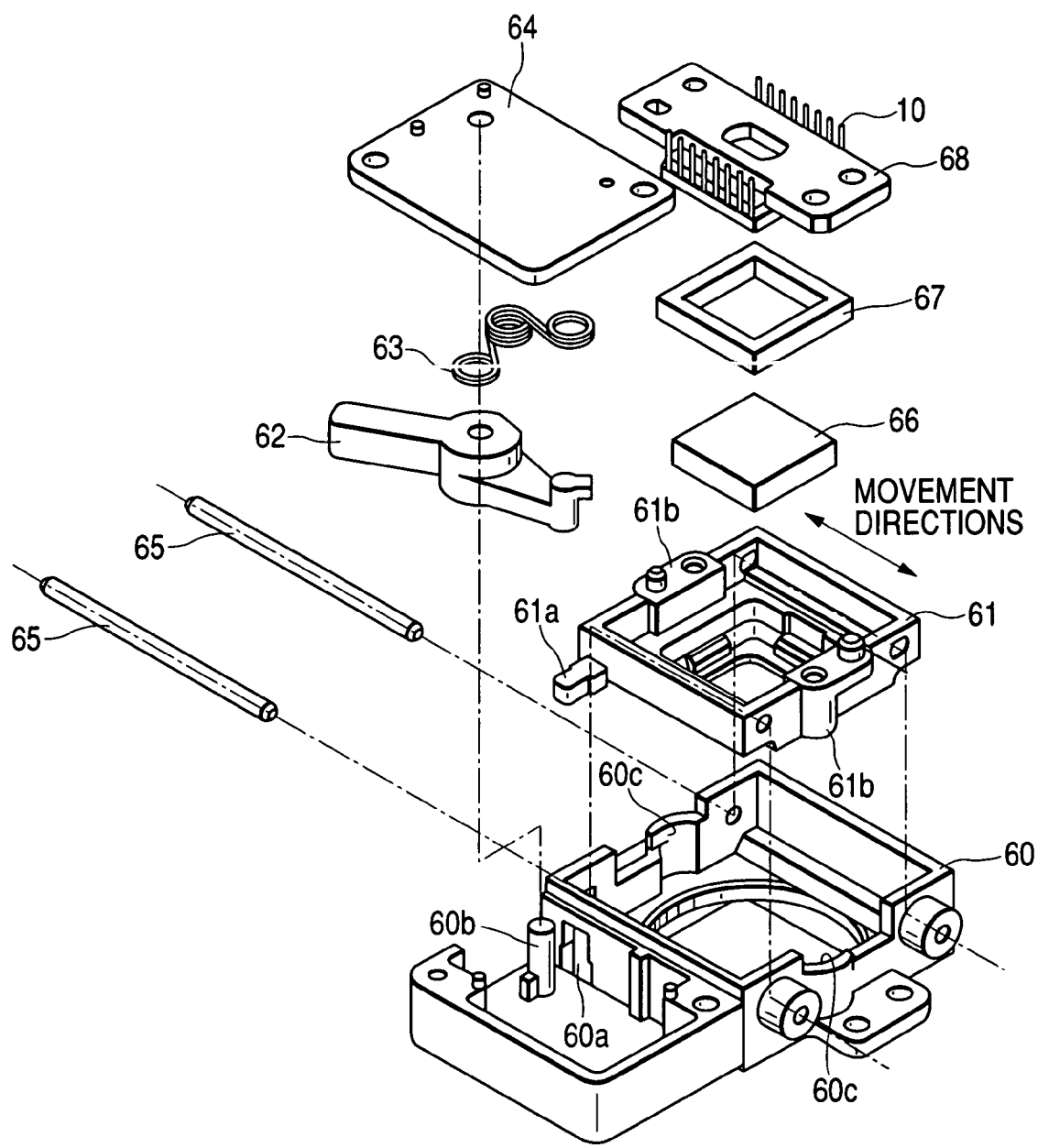
FIG. 7 is an exploded perspective view of a mechanism for moving the solid-state imaging element array in the first embodiment of this invention.
Figure 8:
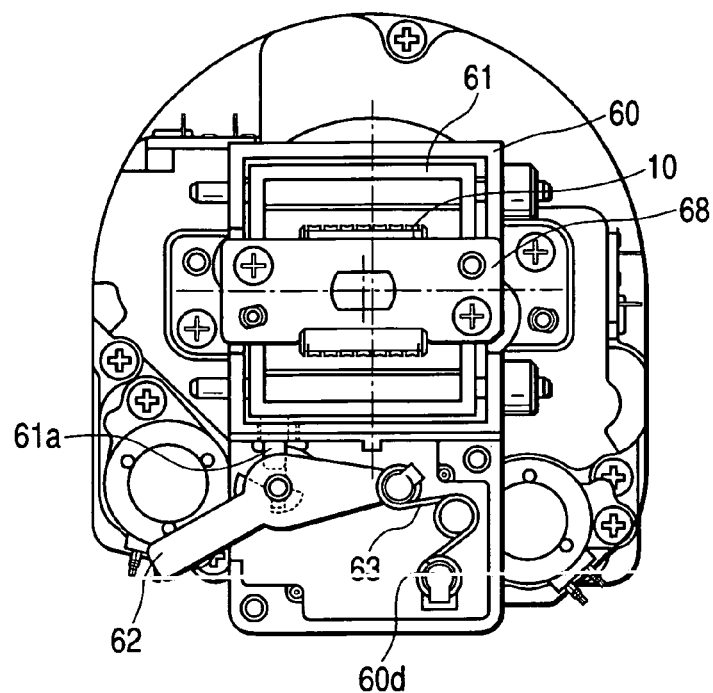
FIG. 8 is a plan view of the mechanism of FIG. 7 in which a movable frame for carrying the solid-state imaging element array is located at a first limit position.
Figure 9:
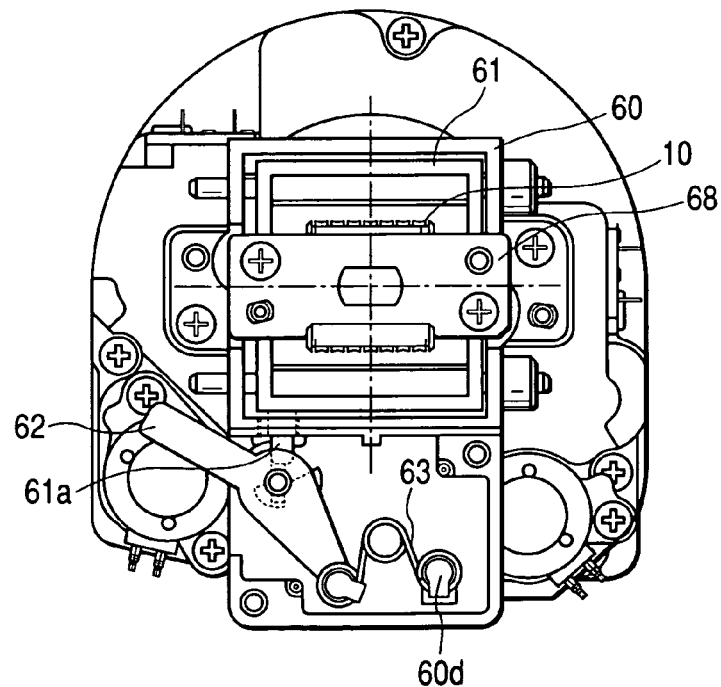
FIG. 9 is a plan view of the mechanism of FIG. 7 in which the movable frame is located at a second limit position.

With reference to FIGS. 7-9, the imaging device includes a fixed frame 60 in which a movable frame 61 is disposed. The body of the optical system is secured to the fixed frame 60. The movable frame 61 can slide relative to the fixed frame 60. A front portion of the movable frame 61, a filter 66, a sealing member 67, the solid-state imaging element array 10, and a fixing plate 68 are successively arranged along the direction of travel of incoming light. The fixing plate 68 is connected with the movable frame 61. The filter 66, the sealing member 67, and the solid-state imaging element array 10 are attached to the movable frame 61 by the fixing plate 68. A pair of parallel guide bars 65 supported by the side walls of the fixed frame 60 extend in the inner space of the fixed frame 60. The movable frame 61 is slidably supported on the guide bars 65. Therefore, the assembly of the movable frame 61, the filter 66, the sealing member 67, the solid-state imaging element array 10, and the fixing plate 68 can slide relative to the fixed frame 60 along the guide bars 65. In other words, the assembly including the solid-state imaging element array 10 can move back and forth relative to the fixed frame 60 along directions parallel to the guide bars 65. The solid-state imaging element array 10 moves together with the movable frame 61. Thus, the movable frame 61 acts as a carrier for the solid-state imaging element array 10. In addition, the movable frame 61 and the fixing plate 68 act as a holder for firmly retaining the solid-state imaging element array 10.

The fixed frame 60 has a partition wall which separates the fixed-frame inner space into first and second portions. The guide bars 65 and the movable frame 61 are located in the first portion of the inner space of the fixed frame 60. The partition wall of the fixed frame 60 has an opening 60a. The movable frame 61 has a projection 61a extending into the opening 60a and reaching the second portion of the inner space in the fixed frame 60. The fixed frame 60 is provided with a shaft 60b extending in the second portion of the inner space in the fixed frame 60. A change lever 62 is rotatably mounted on the shaft 60b. Thus, the change lever 62 can rotate about the shaft 60b. The change lever 62 is urged by a spring 63 provided between the change lever 62 and a projection 60d on the fixed frame 60. A cover 64 attached to the fixed frame 60 defines a part of the second portion of the inner space in the fixed frame 60. The cover 64 engages an end of the shaft 60b.

As the movable frame 61 slides in a first direction, the movable frame 61 encounters a first side wall of the fixed frame 60 and thus reaches a first limit position. The optical axis center of the lens 80 falls into the position X1 (see FIG. 3) when the movable frame 61 reaches the first limit position. As the movable frame 61 slides in a second direction opposite to the first direction, the movable frame 61 encounters a second side wall of the fixed frame 60 and thus reaches a second limit position. The second side wall of the fixed frame 60 is opposed to the first side wall thereof. The optical axis center of the lens 80 falls into the position X2 (see FIG. 3) when the movable frame 61 reaches the second limit position.

A part of the change lever 62 projects from the fixed frame 60. The change lever 62 has first and second ends. The first end of the change lever 62 is located outside the fixed frame 60, and can be accessed by a user. An intermediate portion of the change lever 62 can engage the projection 61a on the movable frame 61. The second end of the change lever 62 engages one end of the spring 63. The other end of the spring 63 is connected with the projection 60d on the fixed frame 60. As the change lever 62 is rotated, the movable frame 61 slides between the first and second limit positions relative to the fixed frame 60.

The force of the spring 63 can be transmitted to the movable frame 61 via the change lever 62 and the projection 61a on the movable frame 61. When the movable frame 61 is in its first limit position as shown in FIG. 8, that is, when the optical axis center of the lens 80 is in its position X1 (see FIG. 3), the spring 63 urges the movable frame 61 against the first side wall of the fixed frame 60. Therefore, the spring 63 holds the movable frame 61 in its first limit position. When the movable frame 61 is in its second limit position as shown in FIG. 9, that is, when the optical axis center of the lens 80 is in its position X2 (see FIG. 3), the spring 63 urges the movable frame 61 against the second side wall of the fixed frame 60. Therefore, the spring 63 holds the movable frame 61 in its second limit position. The movable frame 61 is shifted between the first and second limit positions as the change lever 62 is rotated.

The movable frame 61 has first and second curved outer surfaces 61b. The fixed frame 60 has first and second curved inner surfaces 60c conforming to the first and second curved outer surfaces 61b of the movable frame 61. The first curved outer surface 61b of the movable frame 61 is in contact with the first curved inner surface 60c of the fixed frame 60 when the movable frame 61 is in its first limit position. The second curved outer surface 61b of the movable frame 61 is in contact with the second curved inner surface 60c of the fixed frame 60 when the movable frame 61 is in its second limit position. The contact between the curved surfaces of the fixed frame 60 and the movable frame 61 provides a high accuracy of the first and second limit positions of the movable frame 61 in directions perpendicular to the directions of slide of the movable frame 61.

The change lever 62 may be driven by an actuator such as a motor or a solenoid. In this case, the actuator is controlled by the control portion 12 in response to the mode selection signal.

The change lever 62 may be replaced by a gear mechanism for driving the movable frame 61 relative to the fixed frame 60. An actuator such as a motor or a solenoid may be used to drive the movable frame 61 relative to the fixed frame 60. In this case, the actuator is controlled by the control portion 12 in the previously-mentioned way. Preferably, the drive of the movable frame 61 is linked with the change of an effective region or regions in the solid-state imaging element array 10.

Second Embodiment

Figure 10:
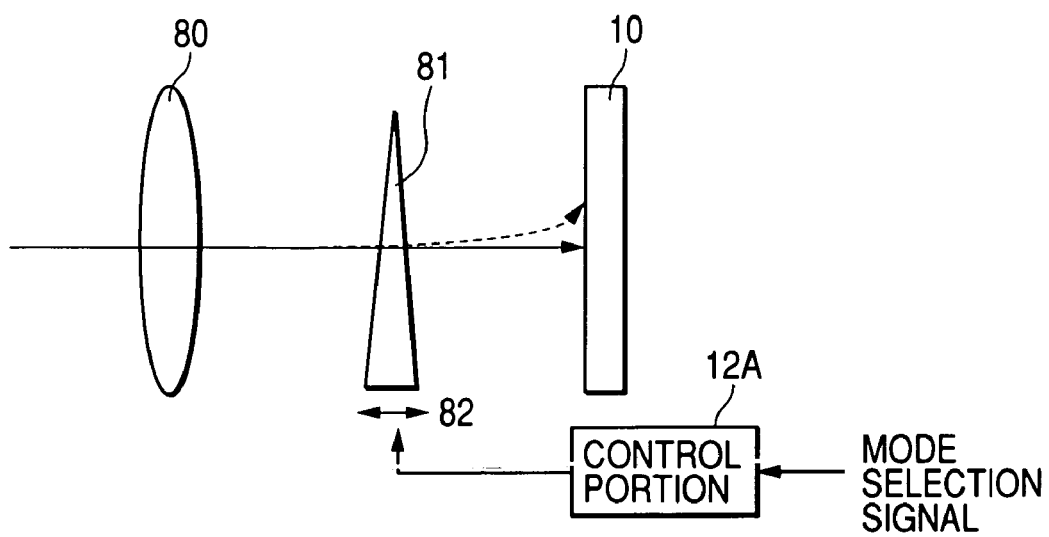
FIG. 10 is a diagram of a portion of an imaging device according to a second embodiment of this invention.

FIG. 10 shows a second embodiment of this invention which is similar to the first embodiment thereof except for design changes mentioned hereafter. As shown in FIG. 10, the second embodiment of this invention includes a variable vertical-angle prism 81 located between the lens 80 and the solid-state imaging element array 10. The lens 80 and the prism 81 are contained in an optical system extending in front of the solid-state imaging element array 10. There is an actuator for varying the vertical angle of the prism 81, that is, the effective thickness thereof. As the vertical angle or effective thickness of the prism 81 is varied, the optical axis center of the optical system moves relative to the solid-state imaging element array 10.

The second embodiment of this invention further includes a control portion 12A instead of the control portion 12 (see FIG. 2). The control portion 12A drives and controls the actuator to change the optical axis center between the positions X1 and X2 (see FIG. 3) in response to the mode selection signal.

Third Embodiment

Figure 11:
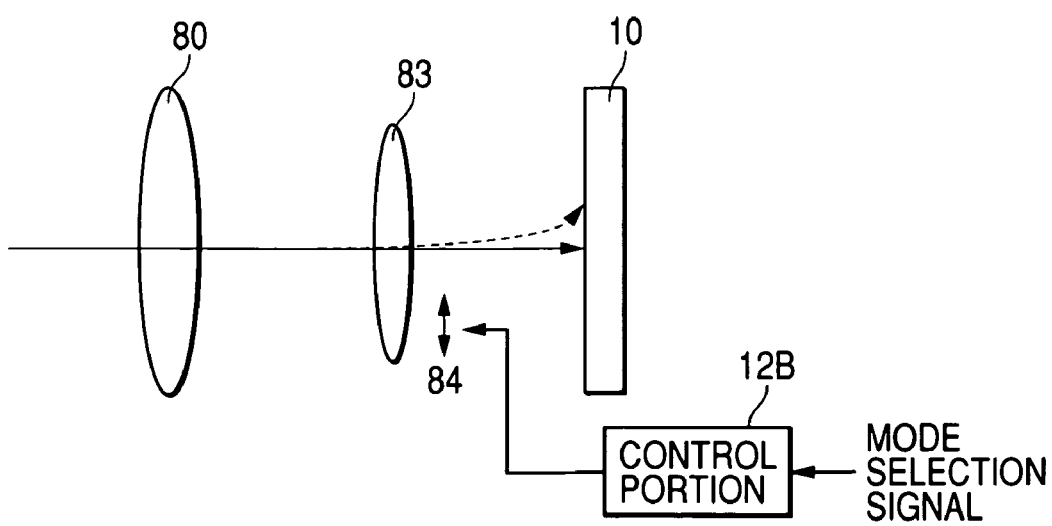
FIG. 11 is a diagram of a portion of an imaging device according to a third embodiment of this invention.

FIG. 11 shows a third embodiment of this invention which is similar to the first embodiment thereof except for design changes mentioned hereafter. As shown in FIG. 11, the third embodiment of this invention includes a movable shift lens 83 located between the lens 80 and the solid-state imaging element array 10. The lenses 80 and 83 are contained in an optical system extending in front of the solid-state imaging element array 10. There is an actuator for moving the shift lens 83 in a direction perpendicular to the direction of travel of incoming light. As the shift lens 83 is moved, the optical axis center of the optical system moves relative to the solid-state imaging element array 10.

The third embodiment of this invention further includes a control portion 12B instead of the control portion 12 (see FIG. 2). The control portion 12B drives and controls the actuator to change the optical axis center between the positions X1 and X2 (see FIG. 3) in response to the mode selection signal.

The third embodiment of this invention implements an anti-shake process as follows. A shake of the solid-state imaging element array 10 is detected, and information representative thereof is generated in a known way. The shake information is fed to the control portion 12B. The control portion 12B drives and controls the actuator, and thereby moves the shift lens 83 to compensator for the shake.

Accordingly, the shift lens 83 is used for both the movement of the optical axis center and the anti-shake process. Two shift lenses may be provided for the movement of the optical axis center and the anti-shake process, respectively.

Fourth Embodiment

A fourth embodiment of this invention is similar to the first embodiment thereof except for design changes mentioned hereafter.

Figure 12:
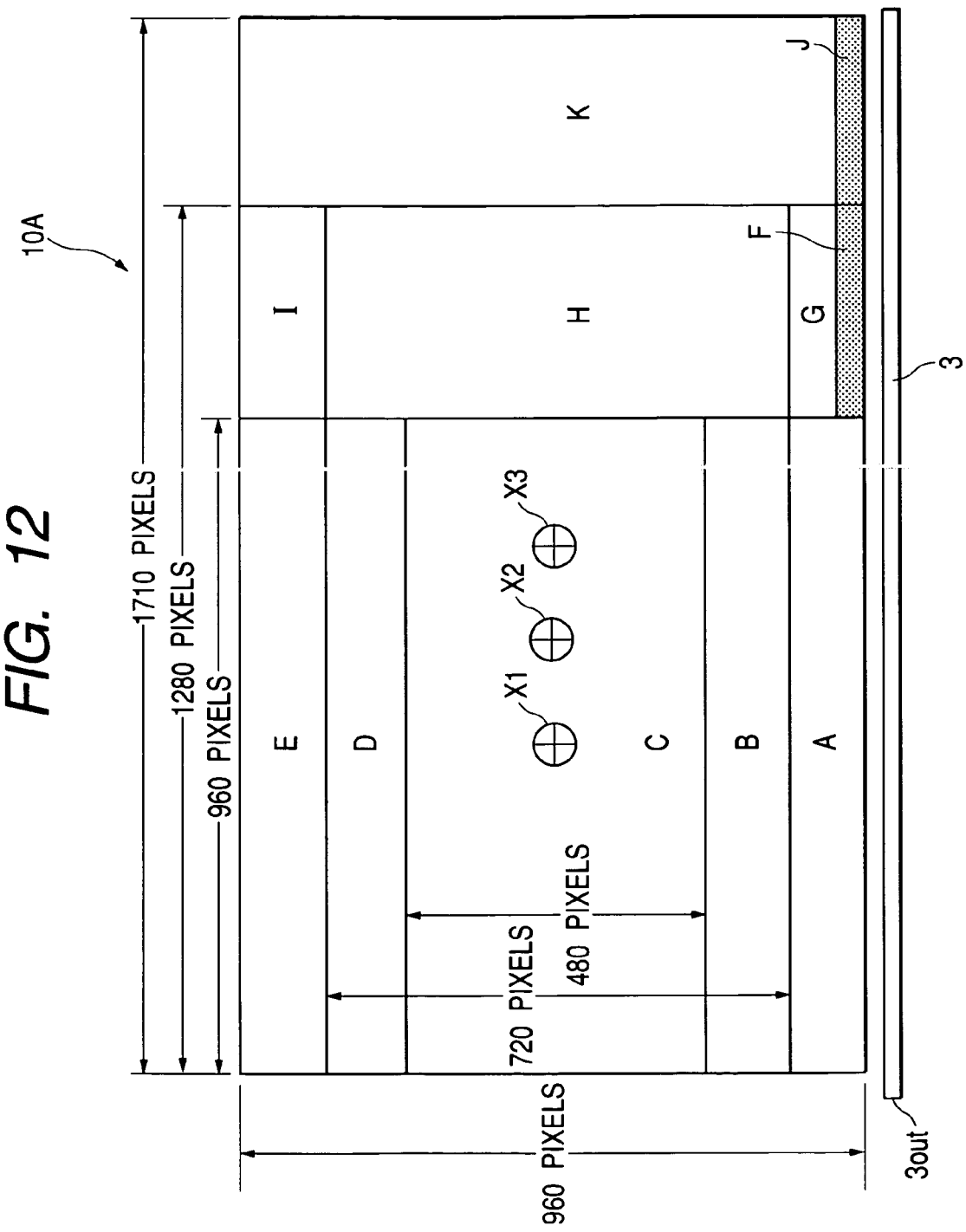
FIG. 12 is a diagram of a solid-state imaging element array in an imaging device according to a fourth embodiment of this invention.

FIG. 12 shows a solid-state imaging element array 10A in the fourth embodiment of this invention. The solid-state imaging element array 10A replaces the solid-state imaging element array 10 in FIG. 3.

As shown in FIG. 12, the solid-state imaging element array 10A is of a matrix structure having 1710 photosensor pixels (photoelectric conversion elements) in a horizontal direction and 960 photosensor pixels (photoelectric conversion elements) in a vertical direction. The horizontal direction and the vertical direction correspond to the row direction and the column direction with respect to the matrix, respectively. The photosensitive area of the solid-state imaging element array 10A is divided into rectangular regions "A", "B", "C", "D", "E", "F", "G", "H", "I", "J", and "K" having horizontal and vertical sides extending along the horizontal and vertical directions. The regions "A"-"I" are similar to those in FIG. 3. The regions "J" and "K" are successively arranged in that order and align with each other as viewed in the upward vertical direction. The region "J" adjoins the horizontal CCD 3. In FIG. 12, the group of the regions "J" and "K" is located at the right of the group of the regions "F", "G", "H", and "I". The region "J" adjoins the region "F" and horizontally aligns therewith. The region "K" adjoins the set of the regions "G", "H", and "I", and horizontally aligns therewith. The group of the regions "J" and "K" has 430 photosensor pixels in the horizontal direction and 960 photosensor pixels in the vertical direction.

An imaging device in the fourth embodiment of this invention operates in one selected from various modes including a first moving-picture taking mode, a second moving-picture taking mode, a first still-picture taking mode, and a second still-picture taking mode. The first and second moving-picture taking modes are similar to those in the first embodiment of this invention. The second moving-picture taking mode may be omitted. The first still-picture taking mode is similar to the still-picture taking mode in the first embodiment of this invention.

The optical axis center of the optical system or the lens 80 (see FIG. 2) can be shifted among horizontally-spaced positions X1, X2, and X3 on the solid-state imaging element array 10A. The positions X1 and X2 are similar to those in FIG. 3. The position X3 coincides with the center of the set of all the regions "A"-"K".

During the first moving-picture taking mode of operation, the optical axis center is set at the position X1, and the regions "F" and "J" are controlled to block the transfer of signal charges from the regions "G", "H", "I", and "K" to the horizontal CCD 3. Only signal charges generated in the region "C" are used to generate a television signal.

During the second moving-picture taking mode of operation, the optical axis center is set at the position X2, and the region "F" is controlled to allow the transfer of signal charges from the region "H" to the horizontal CCD 3 while the region "J" is controlled to block the transfer of signal charges from the region "K" to the horizontal CCD 3. Only signal charges generated in the regions "B", "C", "D", and "H" are used to generate a television signal.

During the first still-picture taking mode of operation, the optical axis center is set at the position X2, and the region "F" is controlled to allow signal-charge transfer and operate as normal one while the region "J" is controlled to block the transfer of signal charges from the region "K" to the horizontal CCD 3. Only signal charges generated in the regions "A"-"I" are used to generate a picture signal.

During the second still-picture taking mode of operation, the optical axis center is set at the position X3, and the regions "F" and "J" are controlled to allow signal-charge transfer and operate as normal ones. Accordingly, signal charges generated in all the regions "A"-"K" are used to generate a picture signal.

Fifth Embodiment

A fifth embodiment of this invention is similar to one of the first to fourth embodiments thereof except for design changes mentioned hereafter. According to the fifth embodiment of this invention, an edge portion of the photosensitive area of the solid-state imaging element array 10 or 10A which is lower in signal-charge generation performances than other portions is excluded from the generation of a still-picture signal. In other words, only signal charges generated in the photosensitive area except the edge portion are used to generate the still-picture signal.

Advantages Provided by the Invention

It is possible to generate a signal representing a still or moving picture composed of a large number of pixels without increasing the rate of transfer of signal charges by a horizontal CCD to a high value. It is possible to output any one of television signals and picture signals of various formats.

A solid-state imaging element array is attached to a movable frame slidably supported on a fixed frame. The body of an optical system is secured to the fixed frame. The solid-state imaging element array moves together with the movable frame relative to the fixed frame and the optical system. The relative movement between the solid-state imaging element array and the optical system enables the axis of the optical system to be correctly coincident with the center of a variable actually-used area (a variable effective area) of the solid-state imaging element array.

Alternatively, the optical system may be provided with a mechanism for shifting the optical-system axis relative to the solid-state imaging element array. The mechanism enables the optical-system axis to be correctly coincident with the center of the variable actually-used area of the solid-state imaging element array.

What is claimed is:

1. An imaging device comprising:
a solid-state imaging element array including a matrix of photosensor pixels;
first means for setting an effective area in the solid-state imaging element array to a first region during a first mode of operation of the imaging device, and setting the effective area to a second region during a second mode of operation of the imaging device, the first and second regions being different from each other in number of photosensor pixels contained therein;
a holder for retaining the solid-state imaging element array;
second means for moving the holder between a first position at which an optical axis related to light incident to the solid-state imaging element array coincides with a center of the first region and a second position at which the optical axis coincides with a center of the second region;
third means for fixing the holder at the first position during the first mode of operation of the imaging device, and fixing the holder at the second position during the second mode of operation of the imaging device;
fourth means for generating a first picture signal from signal components generated in the first region of the solid-state imaging element array during the first mode of operation of the imaging device; and
fifth means for generating a second picture signal from signal components generated in the second region of the solid-state imaging element array during the second mode of operation of the imaging device;
wherein the second means comprises a guide bar, means for slidably supporting the holder on the guide bar, a movable member, and means for moving the holder along the guide bar in accordance with movement of the movable member.

2. An imaging device as recited in claim 1, wherein the matrix in the solid-state imaging element array has a first predetermined number "a" of photosensor pixels in a horizontal direction and a second predetermined number "b" of photosensor pixels in a vertical direction, the first region has the first predetermined number "a" of photosensor pixels in the horizontal direction and the second predetermined number "b" of photosensor pixels in the vertical direction, and the second region has a third predetermined number "c" of photosensor pixels in the horizontal direction and the second predetermined number "b" of photosensor pixels in the vertical direction, the third predetermined number "c" is smaller than the first predetermined number "a".

3. An imaging device comprising:
a solid-state imaging element array including a matrix of photosensor pixels;
first means for setting an effective area in the solid-state imaging element array to a first region during a first mode of operation of the imaging device, and setting the effective area to a second region during a second mode of operation of the imaging device, the first and second regions being different from each other in number of photosensor pixels contained therein;
a holder for retaining the solid-state imaging element array;
second means for moving the holder between a first position at which an optical axis related to light incident to the solid-state imaging element array coincides with a center of the first region and a second position at which the optical axis coincides with a center of the second region;
third means for fixing the holder at the first position during the first mode of operation of the imaging device, and fixing the holder at the second position during the second mode of operation of the imaging device;
fourth means for generating a first picture signal from signal components generated in the first region of the solid-state imaging element array during the first mode of operation of the imaging device; and
fifth means for generating a second picture signal from signal components generated in the second region of the solid-state imaging element array during the second mode of operation of the imaging device;
wherein the second means comprises a guide bar, means for slidably supporting the holder on the guide bar, a movable lever, and means for moving the holder along the guide bar in accordance with movement of the lever.

4. An imaging device as recited in claim 3, wherein the matrix in the solid-state imaging element array has a first predetermined number "a" of photosensor pixels in a horizontal direction and a second predetermined number "b" of photosensor pixels in a vertical direction, the first region has the first predetermined number "a" of photosensor pixels in the horizontal direction and the second predetermined number "b" of photosensor pixels in the vertical direction, and the second region has a third predetermined number "c" of photosensor pixels in the horizontal direction and the second predetermined number "b" of photosensor pixels in the vertical direction, the third predetermined number "c" is smaller than the first predetermined number "a".

5. An imaging device comprising:
a solid-state imaging element array including a matrix of photosensor pixels;
first means for setting an effective area in the solid-state imaging element array to a first region during a first mode of operation of the imaging device, and setting the effective area to a second region during a second mode of operation of the imaging device, the first and second regions being different from each other in number of photosensor pixels contained therein;
an optical system extending in front of the solid-state imaging element array;
second means included in the optical system for moving an optical axis of the optical system relative to the solid-state imaging element array;
third means for controlling the second means to set the optical axis coincident with a center of the first region during the first mode of operation of the imaging device, and to set the optical axis coincident with a center of the second region during the second mode of operation of the imaging device;
fourth means for generating a first picture signal from signal components generated in the first region of the solid-state imaging element array during the first mode of operation of the imaging device; and
fifth means for generating a second picture signal from signal components generated in the second region of the solid-state imaging element array during the second mode of operation of the imaging device;
wherein the second means comprises a holder for retaining the solid-state imaging element array, a guide bar, means for slidably supporting the holder on the guide bar, a movable member, and means for moving the holder along the guide bar in accordance with movement of the movable member.

6. An imaging device as recited in claim 5, wherein the matrix in the solid-state imaging element array has a first predetermined number "a" of photosensor pixels in a horizontal direction and a second predetermined number "b" of photosensor pixels in a vertical direction, the first region has the first predetermined number "a" of photosensor pixels in the horizontal direction and the second predetermined number "b" of photosensor pixels in the vertical direction, and the second region has a third predetermined number "c" of photosensor pixels in the horizontal direction and the second predetermined number "b" of photosensor pixels in the vertical direction, the third predetermined number "c" is smaller than the first predetermined number "a".

7. An imaging device as recited in claim 5, wherein the movable member comprises a movable lever.

* * * * *